US008250069B2

(12) United States Patent
Jandhyala (10) Patent No.: US 8,250,069 B2
(45) Date of Patent: Aug. 21, 2012

(54) GREEN'S FUNCTION FORMULATIONS FOR PAGERANK ALGORITHM USING HELMHOLTZ WAVE EQUATION REPRESENTATIONS OF INTERNET INTERACTIONS

(75) Inventor: Vikram Jandhyala, Seattle, WA (US)

(73) Assignee: University of Washington, Seattle, WA (US)

(*) Notice: Subject to any disclaimer, the term of this patent is extended or adjusted under 35 U.S.C. 154(b) by 855 days.

(21) Appl. No.: 12/250,990

(22) Filed: Oct. 14, 2008

(65) Prior Publication Data

US 2010/0094904 A1   Apr. 15, 2010

(51) Int. Cl.
  *G06F 7/00* (2006.01)
  *G06F 17/30* (2006.01)
(52) U.S. Cl. ........................................ 707/726; 707/748
(58) Field of Classification Search .................. 707/726, 707/748
  See application file for complete search history.

(56) References Cited

U.S. PATENT DOCUMENTS

| 5,450,535 | A  | * | 9/1995 | North ............................. 345/440 |
| 5,596,703 | A  | * | 1/1997 | Eick et al. ...................... 715/700 |
| 6,285,999 | B1 | * | 9/2001 | Page ........................... 707/999.7 |
| 7,379,947 | B2 |   | 5/2008 | McSherry ...................... 707/102 |
| 7,797,344 | B2 | * | 9/2010 | Kaul et al. ..................... 707/791 |
| 7,912,831 | B2 | * | 3/2011 | Joshi et al. .................... 707/709 |
| 2008/0010281 | A1 |   | 1/2008 | Berkhin et al. .................... 707/7 |

OTHER PUBLICATIONS

Brin et al. "The Anatomy of a Large-Scale Hypertextual Web Search Engine", 1998, Published in Proc. 7th International Conference on World Wide Web, vol. 91, pp. 107-117.*
Perra et al. "Schrödinger-Like PageRank equation and localization in the WWW", Jul. 2, 2008, pp. 1-5.*
Perra et al. "Schröedinger-like PageRank equation and localization in the WWW", Jul. 28, 2008, pp. 1-5.

* cited by examiner

*Primary Examiner* — James Trujillo
*Assistant Examiner* — Pavan Mamillapalli
(74) *Attorney, Agent, or Firm* — Christensen O'Connor Johnson Kindness PLLC (57) ABSTRACT

A novel approach to determining PageRank for web pages views the problem as being comparable to solving for an electromagnetic field problem. This view of ranking web pages enables appropriate entries for a matrix G of the web (or a subset), so that fast-solver techniques can be employed to iterate G, solving for ranks, or a dominant eigenstructure, achieving an O(N log N) performance in time and memory requirements. The specific solver technique that is used can be, for example, a fast multi-pole method (FMM), or a multilevel low-rank compression method. Once the problem is correctly formulated, it is not necessary to create the matrix G. Local information can be queried on demand by the solver. This approach can also be used to determine different scores of web pages, such as TrustRank, which is indicative of their trustworthiness.

20 Claims, 5 Drawing Sheets

ADAPTIVE MESHING
$K_4 > K_1 > K_2 > K_3 > K_5$
K: WAVE NUMBER

GREEN'S FUNCTION FORMULATIONS FOR PAGERANK ALGORITHM USING HELMHOLTZ WAVE EQUATION REPRESENTATIONS OF INTERNET INTERACTIONS

BACKGROUND

The Internet or world wide web can be viewed as a "directed graph," in which web pages are the nodes of the graph, and each directed edge of the graph indicates a hyperlink from one web page to another. The norm of a node or web page is thus the number of outward-pointing links from this node, denoted $|P|$. The rank of a node is given by the equation:

$$r(P_i) = \Sigma_{j \in ln(i)} r(P_j)/|P|.$$

PageRank values for web pages play an important role in the method used to determine the order of search results displayed to a user who initiates a search on key words or phrases. Search engines thus use PageRank values and other parameters to determine the ordering of the web pages produced in response to search queries of the Internet, subsets of the Internet, or other networks. The ranks r(P) of nodes or web pages are conventionally computed through an iterative process using over one hundred heuristics to guarantee convergence. The iterative system is given by:

$$r^{k+1} = r^k G$$

in which G is a large sparse matrix. Each entry in the $j^{th}$ row of G is either 0 or $1/|P_j|$.

As the size of the Internet has continued to grow over time, the number of nodes in the graph has increased by more than two orders of magnitude. More specifically, the number of web pages on the world wide web has recently grown from about $10^9$ to $10^{10}$ and will soon be more than $10^{11}$. The iterative solvers that are now used to determine PageRank operate in $O(N^2)$ time in the number of nodes, so using the current methods to compute PageRank for $10^{11}$ web pages in the future will require about 100 to 10,000 times as long to compute as is currently the case.

In addition, the connectivity of web pages on the Internet is increasing, which means that the matrix G is becoming less sparse and will have increasingly more dense sub-matrices corresponding to online communities, blogs, and social networks, each of which represents a block of related interconnected nodes. Sparse matrix techniques operate in $O(N^2)$ time in the number of nodes and require $O(N^2)$ memory. With the growth in the size of the Internet, this increased time and degradation of memory performance will become a problem, unless alternative approaches are used to determine PageRank and related web page scores.

Other requirements that are being considered will also increasingly impact on the need for efficiently determining the ranking of web pages. For example, it has been recommended that search and ranking be user-dependent. The effect of making such a change in the current manner of determining rankings for web pages would be to replace the uniform row-weights in the G matrix with other values. All of these trends will combine to create a new matrix H, which is large and dense. Accordingly, a new approach will be needed to derive rankings from H, with efficiency in both time and memory requirements.

SUMMARY

In consideration of the preceding problems that are likely to grow as the web continues to increase in size and complexity, a novel method has been developed for more efficiently determining a score for each of a plurality of web pages. The score of a web page can relate to a predefined characteristic of the web page, such as its rank. The method includes the steps of creating a directed graph that defines regions for at least a portion of a network, based on properties associated with the regions, wherein the web pages included in each region have the same score. The scores of the web pages in the regions of the directed graph are then determined using a Helmholtz equation. The scores of the web pages are then used in a physical function. For example, the scores can be stored in a non-volatile storage, or displayed. Or, a sequence of the web pages can be displayed in an order that is based upon their scores of the web pages, or the web pages can be displayed in groups based upon the scores of the web pages in each group.

The method can also include the step of accelerating the determination of the scores using the Helmholtz equation. This step may include the steps of setting up a mesh for the regions, and a compressed matrix for the mesh. The compressed matrix is then iteratively solved to obtain a value at each node of the directed graph, where nodes of the directed graph correspond to web pages. The values that were obtained for the nodes can then be normalized to determine the scores of the web pages.

While other types of scores are contemplated, the scores can comprise either PageRanks or TrustRanks for the web pages. It is also contemplated that scores can be determined that are specific to a user, or to a domain, or to a context.

Further, the step of accelerating the determination of the scores using the Helmholtz equation can employ a block decomposition of an associated Green's function method of moments approach.

Optionally, the method can include the step of selecting an appropriate mesh for the directed graph and an appropriate basis function when solving for the scores of the web pages, so as to achieve a desired level of coarseness for the directed graph. This approach can produce a desired resolution for the scores of the web pages.

Another option is to provide a time-varying term to the Helmholtz equation before determining the scores of the web pages.

Another aspect of the present novel approach is directed to a memory medium on which machine readable and executable instructions are stored for use in determining a score for each of a plurality of web pages. The machine readable and executable instructions are employed to carry out functions that are generally consistent with the steps of the method noted above. Still another aspect of the technology is directed to a system for determining a score for each of a plurality of web pages. The system includes a memory in which machine executable instructions are stored, a display device for displaying text and images, and a processor coupled to the memory and the display device, for executing the machine executable instructions, to carry out a plurality of functions. Again, these functions are generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Overview

The definition of PageRank has been discussed above. The PageRank of a web page can be computed with the following equation:

$$\phi = cP'\phi + (1-c)EI \quad (1)$$

wherein the value c is used to indicate the probability (typically around 0.85) that a web surfer viewing the current web page will pick an outlink to access a different page that is thus linked to the current page. The probability that the web surfer will become bored with selecting outlinks and instead, randomly choose a new page to view that is not linked to the current page is then $1-c$. The random selection of a new page by the surfer is referred to as "teleportation," since by randomly selecting a new page, the surfer is in a sense, "teleporting" to the new web page from the current page and without following a defined link. Examining the first term in the PageRank equation and ignoring the teleportation term (i.e., by setting the teleportation factor c equal to 1) results in:

$$\phi cP'\phi \quad (2)$$

The matrix P' has terms of the form $1/r_i^{out}$, where the denominator is the outrank of web page or node i, in the ith column of the matrix, for all rows j where the jth node or web page is directly connected to node i. For a large number of nodes (such as the massive and rapidly growing web graph of the entire Internet), or for a subset with large connectivity (such as in blogospheres and other densely connected subsets of the world wide web), and for user-specific search and ranking (where the outrank can be term- or context- and incoming-node specific), the underlying complexity and cost of the solution of the PageRank equation (or of the associated eigenvalue compression or matrix-vector product computation) can become intractable due to the computational overhead and memory requirement.

However, it has been discovered that a direct analogy to determining PageRank can be made to a very different field of technology. Specifically, it has been discovered that the method of moments or Green's function, which is an approach that is frequently used for computing capacitance in electrostatic simulations, can be applied for computing PageRank, or more generally, the "score" of a web page in regard to some other defined parameter or characteristic of the web page. While it can be used for other purposes, PageRank is most often employed in determining the relevance or importance of a web page in regard to other web pages that are returned for a search that is carried out in response to a query entered by a user.

Figure 1:
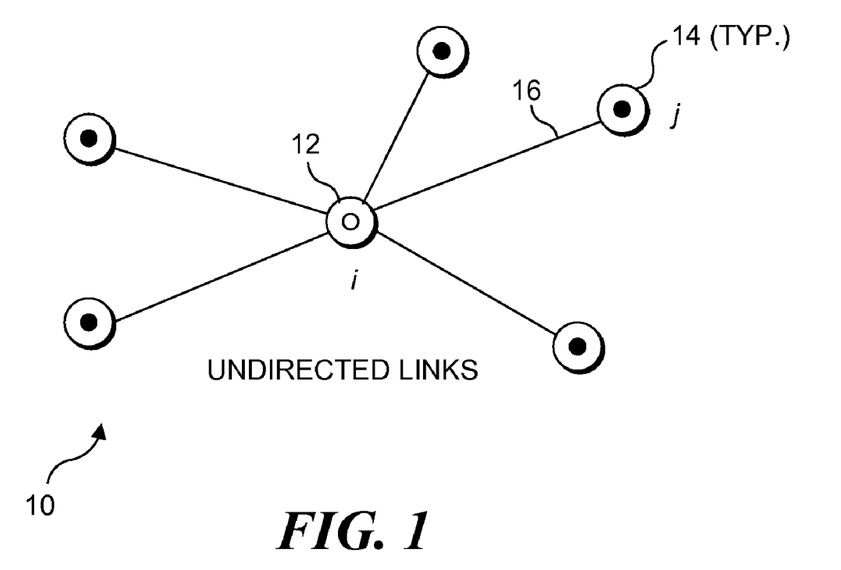
FIG. 1 is a schematic illustration of the Laplacian for an exemplary simple graph with undirected links and unit weights.
Figure 2:
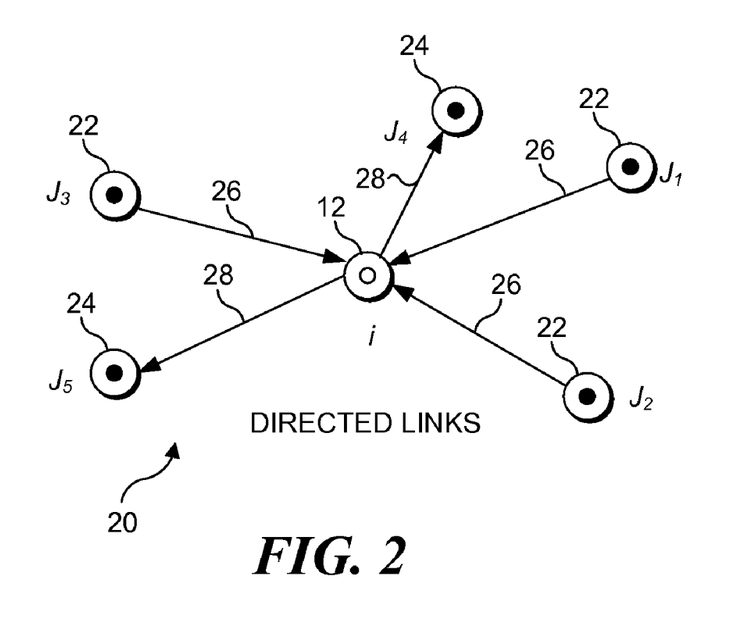
FIG. 2 is a schematic illustration of the Laplacian for an exemplary simple graph with directed links and unit weights.

FIG. 1 illustrates a simple graph 10 with undirected links 16 between nodes 12. While an undirected graph is appropriate for electrostatic functions, the web or Internet employs directed links, like those shown in a corresponding simple directed graph 20 in FIG. 2, wherein a central node 12 or node i, is coupled by inlinks 26 to nodes 22 identified by $j_1, j_2$, and $j_3$, and by outlinks 28 to nodes 24 identified by $j_4$ and $j_5$. In the general case in regard to nodes that are web pages, the directed graph distance from any node 22 to node 12, $d(j \rightarrow i)$ does not have a reciprocal relationship with the directed graph distance from node 12 to any node 24, i.e., $d(j \rightarrow i) \neq d(i \rightarrow j)$.

An underlying consideration in the present novel approach to determining PageRank (or other score value), which is discussed below, is the recognition that the underlying structure of the Green's function-based method of moments matrix is very similar to that of the P' matrix in the PageRank equation noted above. In this case, the element in the ith row and jth column is proportional to the reciprocal of the distance between the ith and jth elements of the mesh. As a result of recognizing this similarity, it has become apparent that the methods used for solving for capacitance in electrostatics can thus also be employed in efficiently determining PageRank or the score of a web page in a manner that is less computationally intensive than the conventional approaches used for this task. Since PageRank is an important factor (but, clearly not the only consideration) in determining the relative importance of web pages returned in response to a search of the Internet (or of some defined subset of the Internet or other network), it will be apparent that the present novel method for more efficiently determining PageRank or score can have far reaching benefits in web searching and in other tasks that use these values.

A large body of work exists regarding techniques to accelerate the determination of capacitance in electrostatic systems, and with the following caveat, this work is potentially directly applicable to the problem for accelerating the determination of PageRank or score for web pages. An important question is whether a set of outranks (or context-specific outranks) arising in the PageRank algorithm can actually be "mapped" to a set of distances in a mesh (like that used for determining capacitance) to complete this transformation for the solution of a problem from one area of technology to another. Note that the mapping between these very different concepts needs to be efficient (no worse than linear in the number of terms being transformed), and a solution must be guaranteed to exist if the mapping is carried out. Additionally, the following question that arises when mapping a topology (the graph for web pages) to a Hilbert (inner product) space. It is relevant to determine under what constraints does such a map exist. For example, the distance measure in a mesh must satisfy the triangular inequality, but there is no guarantee that this condition is true for the corresponding outranks in the PageRank problem. The solution to this question is to enhance the dimensionality of the Hilbert space that is used in electrostatic problems to appropriately place corresponding points in the space used for determining PageRank, which will satisfy these constraints. Unfortunately, this approach can become both a book-keeping nightmare as well as potentially become more expensive than desirable.

It has been shown mathematically that a graph analog of the capacitance system in the Hilbert space, and its solution can be built upon a Green's function formulation or method of moments that operates on the graph, which makes it clear that the proposed approach is indeed appropriate for determining PageRank or web page score. However, there are some generalities and extensions that are needed for the full solution of the PageRank system using the Green's function method of moments, which are discussed below.

1. For a stationary and unique solution to determining the ranks of web pages, a driving term is required. This term appears to be missing in the above representation of the method of moments approach. More specifically, the above equation will only produce eigenvalues, but not a driven solution.
2. Intuitively, the presence of asymmetry (non-reciprocity) in the inlinks and outlinks should generate an underlying inhomogeneity in the space in which the graph is embedded, but this characteristic also appears to be missing.
3. The pure capacitive term appears to miss the dynamic graph-spatial behavior of PageRank, which is analogous to the difference between a pure decaying electrostatic potential and an oscillating full-wave potential in the electrostatic problem.

Corrections for the second and third points noted above can be directly obtained by leaving the general in-degree and out-degree expressions in a derivation that is based on the Green's function method of moments technique. In that case, the additional term derives a different kind of electromagnetic equation, which is the inhomogeneous scalar Helmholtz wave equation. The Helmholtz equation is therefore a better choice in solving for PageRank or web page score. Like the conventional approach for solving for capacitance, the Helmholtz equation set forth below is also very well-studied, and extremely fast solution methods for it have recently been developed that can be directly applied to the graph-of the Internet (or a subset), to determine PageRank or other type of web page score. The Helmholtz equation is:

$$\Delta y(i) + k^2(i) y(i) = 0. \tag{3}$$

The Green's function method of moments technique is also useful in solving the Helmholtz equation and can be accelerated by a variety of methods, including fast multi-pole techniques, fast Fourier transform (FFT)-based techniques, and low-rank compression.

The fast multi-pole method is an approach to accelerate the computation of fields from localized sources or charges. In essence, this technique works by forming multilevel clusters of charges. For locations that are near, a small cluster is used to predict the field. For locations that are far, a large cluster is used to find the field to very high precision. This clustering reduces the cost associated with the estimation of field at N points due to N charges from quadratic in N (proportional to $N^2$), to linear in N (proportional to N), a great saving when N is large. Similarly, when computing scores for many web pages, the fast multi-pole method significantly reduces the associated computational cost of estimating these scores through the accelerated solution of the Helmholtz equation representation of the associated algorithms such as PageRank.

The Fast Fourier transform (FFT)-based method is an approach that is used to accelerate the computation of fields from localized sources or charges. This technique works by first projecting all charges and field observation points on a uniform grid of points. When points are spaced uniformly on a grid, the computation of fields on the grid can be done in time that scales proportional to N log N where N is the number of grid points. The final step in this method is the reverse projection of the field values onto the original locations. The overall computation of field at N points due to N charges is reduced from quadratic in N (proportional to $N^2$) to nearly linear in N (proportional to N log N), which provides a great computational saving when N is large. Similarly, when computing scores for many web pages, this FFT-based method significantly reduces the associated computational cost of estimating these scores through the accelerated solution of the Helmholtz equation representation of the associated algorithms such as PageRank.

Low-rank compression is an approach that is used to accelerate the computation of fields from localized sources or charges. This technique works by exploiting the fact that a field falls off smoothly with distance as source and observer moves further apart. This fact allows for efficient matrix compression. The numerical rank of a matrix representing interactions between charges and observers that are well-separated ranges from low to very high precision, so this matrix can be represented by a product of two low-rank (thin and tall, and short and wide) matrices. This technique can systematically replace the original matrix-vector product by a sum of many small low-rank matrix-vector products. The overall computation of a field at N points due to N charges is reduced from quadratic in N (proportional to $N^2$) to linear in N (proportional to N), a great savings when N is large. Similarly, when computing scores for many web pages, low-rank compression significantly reduces the associated computational cost of estimating these scores through the accelerated solution of the Helmholtz equation representation of the associated algorithms such as PageRank.

However, even when using any of these efficient methods for carrying out the determination of a score for a web page, there is still the question of the first point, which is related to the excited mode (rather than the eigen mode). The eigen mode is related to the intrinsic behavior of a system, i.e., its modes. In an analogous example, the eigen mode is related to a characteristic such as the resonant frequencies of an acoustic cavity, in the absence of any external excitation. The interest here is the response of the system to an external stimulus, which as is shown below, is generated by the presence of the teleportation term. The following discussion is directed to a full derivation that removes all of the restrictions noted above, which apply to simply using the Green's function method of moment approach normally used to solve for capacitance. This full derivation is directly adaptable to solving the problem of determining PageRank or web page score, based on the Helmholtz equation. As indicated in connection with the discussion of the example of FIG. 3 below, the Helmholtz approach provides a physically meaningful embedding of the web pages or nodes into an inhomogeneous medium that provides both physical meaning and a fast solution capability and which is more analogous to the characteristics of a mesh graph of the web or a subset of the web.

As noted above in Eq. (1), the complete PageRank equation can be written as:

$$\phi = cP^t\phi + (1-c)EI$$

which can be expanded as:

$$\phi(i) = c \sum_{j: d(j \to i)=1} \frac{\phi(j)}{r_j^{out}} + \frac{(1-c)}{n}. \qquad (4)$$

Normalizing the PageRank equation with the out-degree, results in:

$$\phi_N(i) = \frac{c}{r_i^{out}} \sum_{j: d(j \to i)=1} \phi_N(j) + \frac{(1-c)}{r_i^{out} n} \qquad (5)$$

$$r_i^{in} \phi_N(i) = \frac{c r_i^{in}}{r_i^{out}} \sum_{j: d(j \to i)=1} \phi_N(j) + \frac{r_i^{in}(1-c)}{r_i^{out} n}. \qquad (6)$$

The above equation can be rewritten in the following form to obtain the Laplacian operator on graphs, as indicated below.

$$r_i^{in} \phi_N(i) \frac{c r_i^{in}}{r_i^{out}} + \left(1 - \frac{c r_i^{in}}{r_i^{out}}\right) r_i^{in} \phi_N(i) = \frac{c r_i^{in}}{r_i^{out}} \sum_{j: d(j \to i)=1} \phi_N(j) + \frac{r_i^{in}(1-c)}{r_i^{out} n} \qquad (7)$$

$$-\frac{c r_i^{in}}{r_i^{out}} \Delta \phi_N(i) + \left(1 - \frac{c r_i^{in}}{r_i^{out}}\right) r_i^{in} \phi_N(i) = \frac{r_i^{in}(1-c)}{r_i^{out} n} \qquad (8)$$

and finally:

$$\Delta \phi_N(i) + \left(-\frac{r_i^{out}}{c} + r_i^{in}\right) \phi_N(i) = \frac{(1-c)}{cn}. \qquad (9)$$

This equation is exactly in the form of an inhomogeneous scalar Helmholtz wave equation:

$$\Delta y(i) + k^2(i) y(i) = -f(i) \qquad (10)$$

where k(i) is the wave number at a node i, f is the excitation or forcing function at the same node, and y is the resulting response. Continuing the electromagnetic analogy, the response y can be considered to be the discrete analog of a full-wave potential. For instance, the full-wave electric potential (and each component of the full-wave magnetic vector potential) satisfies the continuous space version of this equation.

The non-reciprocity of the Internet or web graph produces an effective material inhomogeneity in the background fabric in which the graph is embedded. The uniform forcing term throughout the graph is produced by the second (teleportation term), and this term diminishes proportionately with the number of total nodes. The material comprising each region of the web graph can be viewed as having different properties, as indicated, for example, by the density or relative number of inlinks and outlinks in the region.

Figure 3:
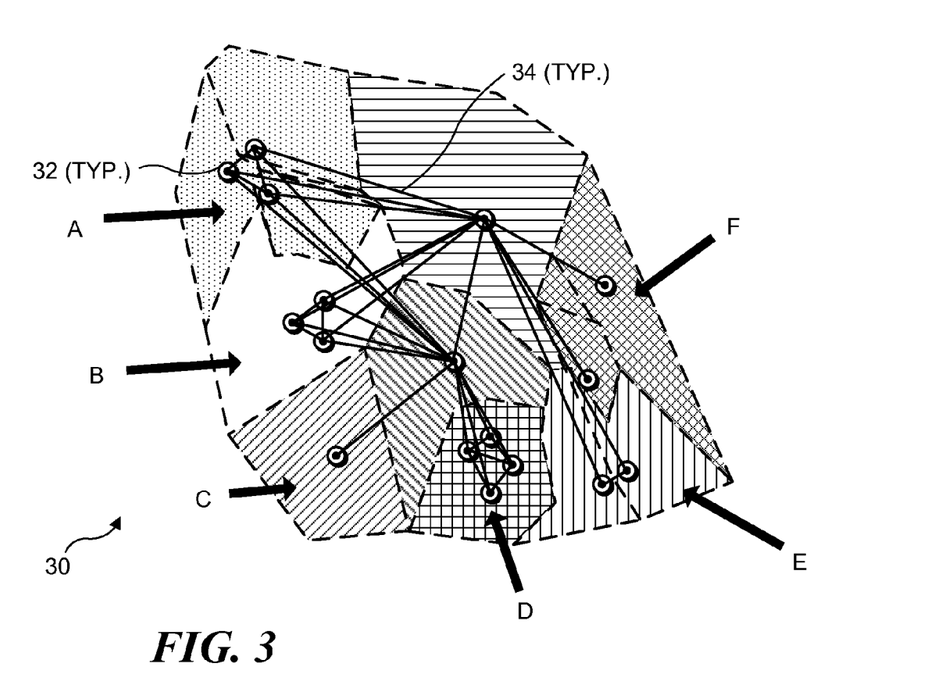
FIG. 3 is an exemplary schematic depiction of an effective medium distribution in an Internet connectivity sub-graph.

FIG. 3 illustrates a simplified schematic diagram 30 that illustrates an exemplary effective medium distribution in an Internet connectivity sub-graph (i.e., the graph is of only a very small subset of the web. For non-planar graphs embedded in p-dimensions, the effective medium boundaries can be formed by p-1 dimensional hyper-planes, creating a Delaunay-like tessellation of the convex hull of the embedding finite space. For convenience, a simple two-dimensional illustration is shown, even though the graph itself is not planar, but instead, in reality is more than two dimensional.

Several features of this example in FIG. 3 are worthy of discussion. Nodes or web pages 32 in a region A possess the same effective material property, as do the nodes in a region F. Regions such as regions B, D, and E, with nodes having the same connectivity (i.e., the same number or degree of inlinks and outlinks) can be merged for convenience. Note that nodes in regions C and E possess the same material property because of identical connectivity. Regions like region D are expected to occur in tightly-coupled or interconnected networks, such as blogosphere communities.

The inhomogeneous Helmholtz equation can be converted to an integral equation through Green's functions and the corresponding graph analogs, which can then be solved in near linear time and memory with recently-developed methods applied to electromagnetic problems, including fast multi-pole, FFT-based methods, and low-rank compression, which were discussed above. This novel representation of the PageRank algorithm opens up the door to several applications where scale/speed/memory savings are critical, a number of which are discussed below.

Exemplary Logical Steps for Determining Score (e.g. PageRank)

Figure 4:
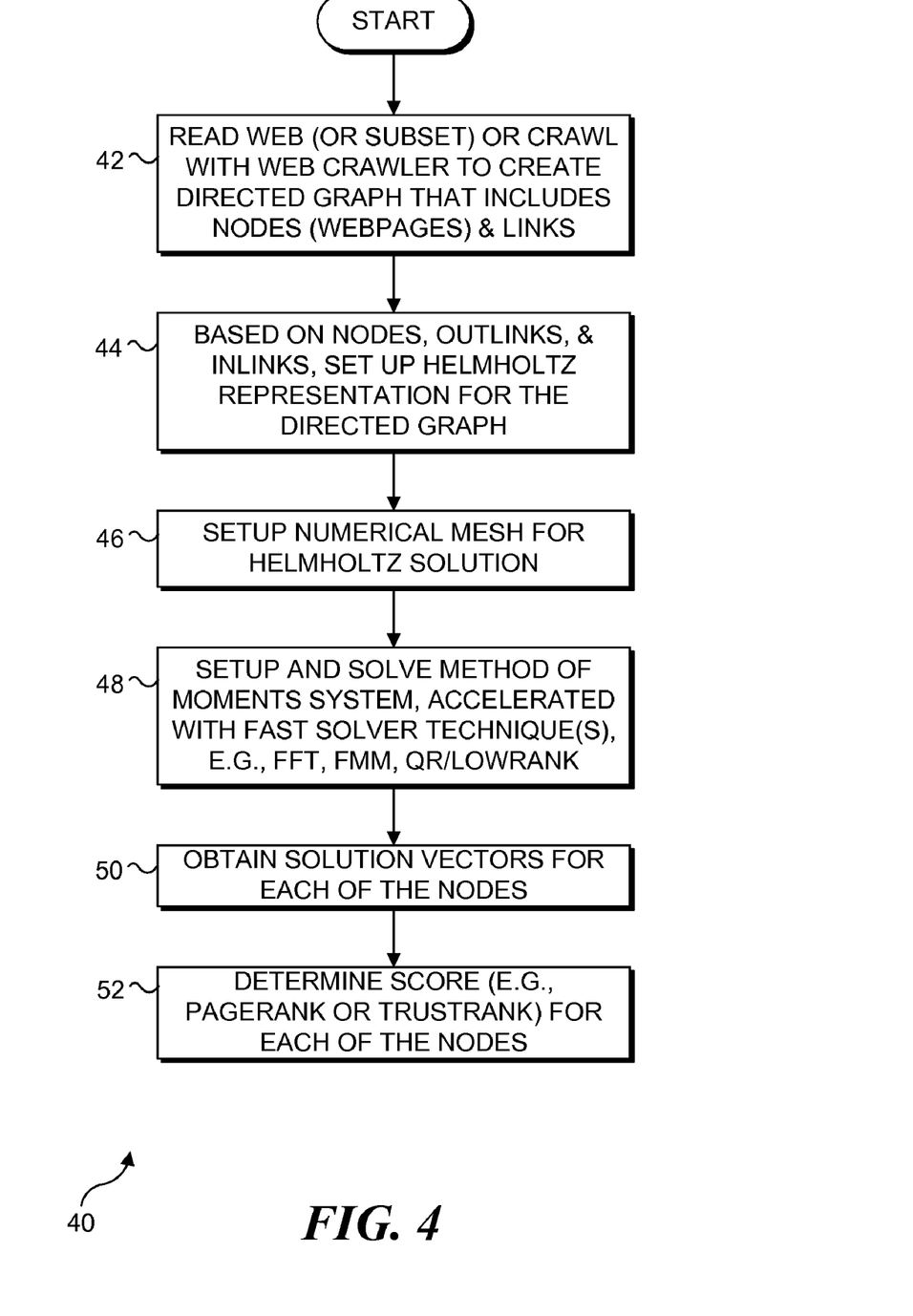
FIG. 4 is a flowchart showing logical steps that are implemented in one exemplary embodiment of the present novel approach.

FIG. 4 includes a flowchart 40 that shows how the scores for a plurality of web pages can be determined in accord with the present novel approach. After starting, a step 42 provides for reading the web (e.g., the Internet or some other network) or a subset of that network, or of crawling the network with a web crawler, to create a directed graph that includes web pages or nodes, and links between certain of the web pages. Step 42 is only necessary if the data provided by the step is not already available, since the data defining the web pages and the links between them is not part of the technique for the present approach for determining a score for each web page based on that data. However, it is necessary to create the directed graph using that data in order to implement the present novel approach.

Based on the nodes or web pages that are included in the data, as well as the outlinks and inlinks to the web pages indicated in the directed graph, a step 44 provides for setting up a Helmholtz representation of the directed graph. A step 46 then sets up a numerical mesh for the Helmholtz representation. Those of ordinary skill in the art of using the Helmholtz equation to solve for capacitance in the electronic arts will readily understand how the numerical mesh is set up for the Helmholtz representation. Next, to accelerate the determination of the score for each node or web page, a step 48 sets up and solves the method of moments system derived from the mesh, and accelerates this solution using fast solver techniques, such as the FFT, FMM, or lowrank compression options, as discussed above.

A step 50 obtains the solution vectors for each of the nodes, which are then evaluated in a step 52 to determine the score, such as PageRank, for each of the nodes or web pages included in the data used to create the directed graph. The scores can then be stored in some non-volatile storage, such as a hard drive, for future use, or can be displayed, or used to sort web pages in an ordered list, or used to group web pages for display to a user, or applied to some other physical use, possibly involving another application.

Determining TrustRank

TrustRank is another type of score that is typically used to rate the quality of web pages or sites. The basic idea is similar to PageRank, in that it uses the link structure of web pages to determine their quality. However, there are two primary differences between PageRank and TrustRank. First, in regard to TrustRank, the quality being determined is the "trustworthiness" of a web page or site rather than a rank or rating for the web page in response to a search. Trustworthiness for a web page typically implies that the web page is not spam and does not include malicious code or other undesired consequences, if accessed in a web browser program. Second, the teleportation term in the Helmholtz equation to determine PageRank models the probability that a person will randomly select a web page on the Internet, rather than selecting a link on a current web page. In TrustRank, the random selection of a web page is limited to web pages that are considered to be trustworthy. The solution TrustRank scores using the present novel approach is initiated by manually selecting a small subset of web pages that are considered trustworthy from all of the web pages on the Internet (or from some defined subset). The nearly identical nature of the TrustRank and PageRank algorithms (with the two distinctions above) make the Helmholtz equation approach for determining the PageRank score values equally applicable to the TrustRank score values for web pages.

Customized PageRank

Customized PageRank refers to modifications to PageRank that enable the search process to become more specific, localized, or focused relative to one or more criteria. Examples of criteria (but without any intended limitation) include Personalized PageRank (i.e., user and Topic-Sensitive PageRank). For example, Personalized PageRank refers to methods to embed in the procedure for determining additional information that impact PageRank (e.g., a user's browsing history, favorite web pages, or localization information). Topic-Sensitive PageRank refers to multiple rankings (scores) for pages depending on the specific topic or context that is being searched. The primary difference between the determination of these customized types of PageRank and the original PageRank discussed above is the requirement for running and storing multiple PageRank values and algorithms (for each user or topic) in parallel. The efficiency of fast solvers for the Helmholtz representation is particularly well suited for these Customized PageRank determinations.

Block Decompositions of PageRank

Figure 6:
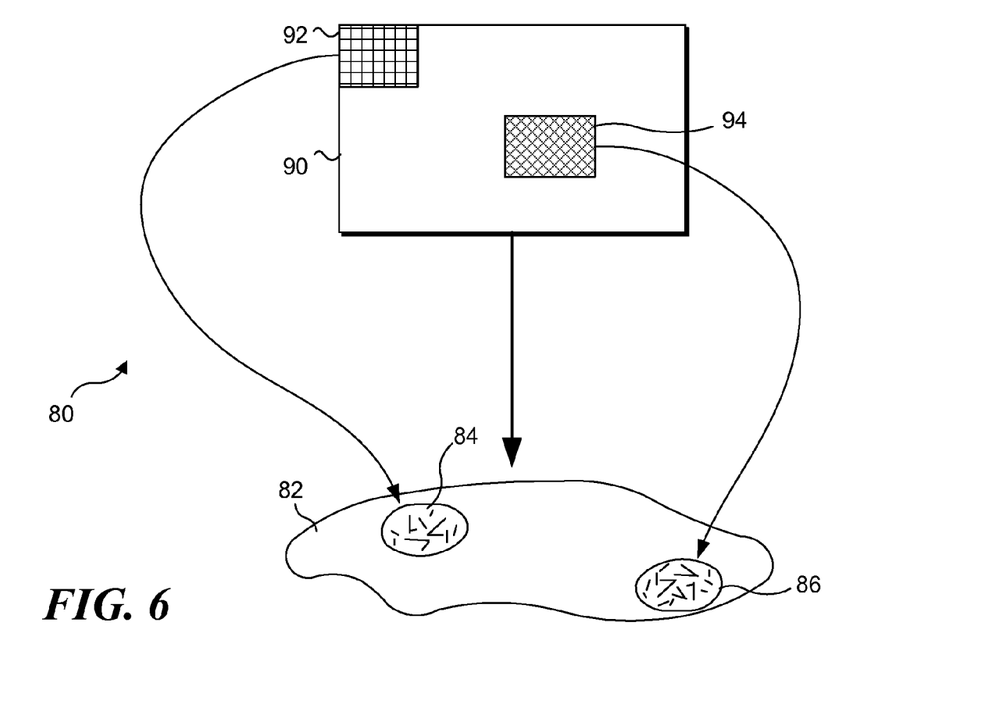
FIG. 6 is an exemplary schematic diagram that illustrates how tightly interlinked web sites can form block structures that can be efficiently processed using the present novel approach.

Web matrices are often seen to have blocked, nested structures. For example, several web sites can all link to a single server or node, and blog communities are often tightly interlinked but weakly-linked to web sites outside the community. This nested relationship results in the PageRank matrix also being represented in a "block" manner. This block structure can be exploited in connection with fast solvers of the Helmholtz equation to achieve an efficient solution of PageRank in the following manner: the mesh representing the Internet or other network can be decomposed into blocked-regions, and compression can proceed within the block-block interactions. This approach is shown by way of an example 80 in FIG. 6. In this simple example, a network 82 includes a region 84 and a region 86. These two regions can respectively be decomposed into blocked-regions 92 and 94 for block-block interactions 90. Thus, it should be apparent from this example, that the interactions between two grouped sub-sections of the Internet graph can be represented by blocks in the PageRank matrix, and this structure can then be exploited for faster extraction of the ranks, e.g., by inverting sub-blocks of the matrix using the techniques disclosed herein.

Alternatives to Eigenvalue/Iterative Solutions

The accelerated method of moments implementation of the Helmholtz graph representation directly presents a way to accelerate matrix-vector products involving the PageRank matrix. This method is useful in two ways. First, the method facilitates the iterative solution of the PageRank system: Here, a Krylov subspace solver such as the conjugate gradient or GMRES proceeds by improving guesses to the solution in multiple steps, each of which requires a matrix-vector product. Second, the method enables uses of eigenvalues of the PageRank matrix, which are of interest to understand underlying structure, sensitivity, etc., of web graphs. The eigenvalues of the PageRank matrix can also be obtained by computing multiple matrix-vector products involving the PageRank matrix.

Time-Varying Term

It is contemplated that the time-varying nature of the internet graph and associated scores of page ranks can be effectively addressed through time-varying changes to the Helmholtz equation. The Internet graph is constantly changing, with new connections and nodes being added and removed, which creates a time-varying effect. Instead of looking at the graph as a fixed entity, this varying nature of the graph can be exploited to rapidly update PageRank values in time, using the same Helmholtz equation discussed above. Evaluation of the time-varying nature can be achieved by tracking the changes in the graph, and rapidly updating the incremental effect on the web page scores without having to resolve the entire PageRank system at every time step.

Coarse/Fine Models

The concept of using the Helmholtz equation to determine PageRank or other score based on a model that is relatively coarse or fine is equivalent to "adaptive meshing" in other types of engineering applications. In other words, the numerical mesh used in modeling the Helmholtz representation of the connected graph is not uniform. The numerical mesh can be adapted to those web pages where more activity (in terms of contribution to PageRank) is expected. This dependence on activity corresponds to those web pages that have a substantial difference of inlinks and outlinks, and produce a large value for the wave number (see FIG. 5).

Figure 5:
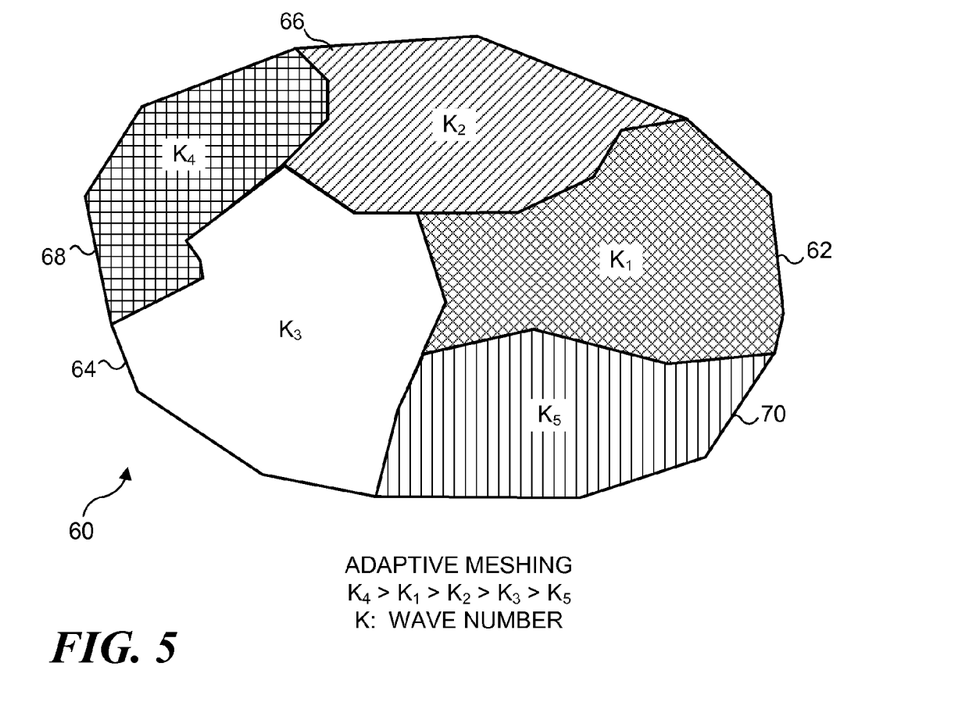
FIG. 5 is a schematic diagram illustrating adaptive meshing wherein regions of different wave numbers (i.e., coarseness/fineness) are illustrated.

As shown for an exemplary mesh 60 in FIG. 5, adaptive meshing determines wave numbers, $K_i$, for blocks of web pages or nodes in a region 62 ($K_1$), a region 66 ($K_2$), a region 64 ($K_3$), a region 68 ($K_4$), and a region 70 ($K_5$). Based on the relative magnitudes of the wave numbers, wherein $K_4 > K_1 > K_2 > K_3 > K_5$, the relative difference in the inlinks and outlinks for the regions is evident for these regions.

Exemplary Computing Device to Determine or Use Score of Web Pages

Figure 7:
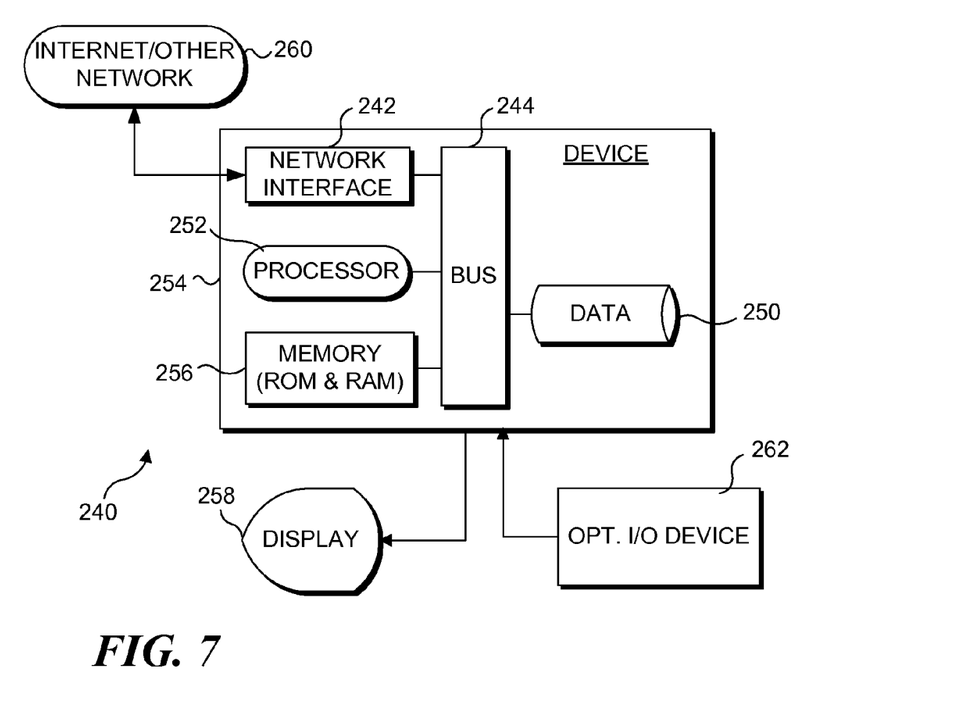
FIG. 7 is a functional block diagram of a generally conventional computing device that can be used for determining the PageRank or other type of score for web pages using the present novel approach.

FIG. 7 schematically illustrates an exemplary device 240 suitable for implementing the present novel technique to determine the PageRank values or other types of scores for web pages on a network, or for using the scores that are determined, e.g., by displaying a list of web pages ordered based on the scores determined for the web pages. While other forms of logic devices can be employed, device 240 can comprise a logic device 254, for example, a generally conventional personal computer (PC) such as a laptop, desktop computer, or a personal data assistant (PDA), a smart phone, or other form of logic processing device. This list of exemplary electronic devices is not intended to be inclusive, but instead, represents just some of the types of devices that may be used in connection with the present novel approach.

Logic device 254 is coupled to a display 258, which can be employed for displaying text and graphics to a user. Included within logic device 254 is a processor 252. A memory 256 (with both read only memory (ROM) and random access memory (RAM)), a non-volatile storage 250 (such as a hard drive or other non-volatile data storage device) for storage of data, digital signals, and software programs, and a network interface 242 are all coupled to processor 252 through a bus 244. The machine instructions that define the steps for implementing the present novel approach are loaded into memory 256 before being executed by processor 252, or may be firmware stored in the memory. It is also contemplated that device 240 may comprise a hardwire logic circuit, or an application specific integrated circuit (ASIC), or other type of logic device.

Logic device 254 can be employed to implement the novel method disclosed above for efficiently calculating scores, such as PageRank, for a plurality of web pages or nodes, but can also use the resulting scores in a physical manner, such as in controlling an order in which web pages returned in response to a query or search are displayed to a user. Processor 252 executes the machine instructions. The machine instructions stored in memory 256 are executed by the processor, causing it to carry out the logical steps, as discussed above. The resulting scores can be stored on storage 250, or on a separate storage—not shown in FIG. 7, which can be accessed by a connection to the Internet/other network 260 through network interface 242. The user can interact with and provide input to logic device 254 using one or more optional input/output (I/O) devices 262, which may, for example, be coupled to bus 244 through a universal serial bus port or other appropriate port (not separately shown).

Once the scores of the web pages have been determined using the present novel approach, logic device 254 can comprise a PC or other computing device that employs the scores for a specific physical function. The computing device will typically include an I/O device 262 comprising a keyboard and/or mouse or other pointing device, as well display 258, which will likely comprise a monitor or other suitable device to view the scores or a list of web pages that have been ordered based upon the scores (e.g., the PageRank) of the web pages. Such a personal computer can initiate a search by enabling a user to type in key words to form a query implemented by a search engine that returns results ordered by the PageRank or TrustRank of the web pages (or based on some other type of score, or limited to user specific, or topic specific web pages) that include the key words or phrases entered. The scores determined by this method can also be stored on storage 250 for subsequent use.

Examples Illustrating Use of PageRank and TrustRank

Figure 8:
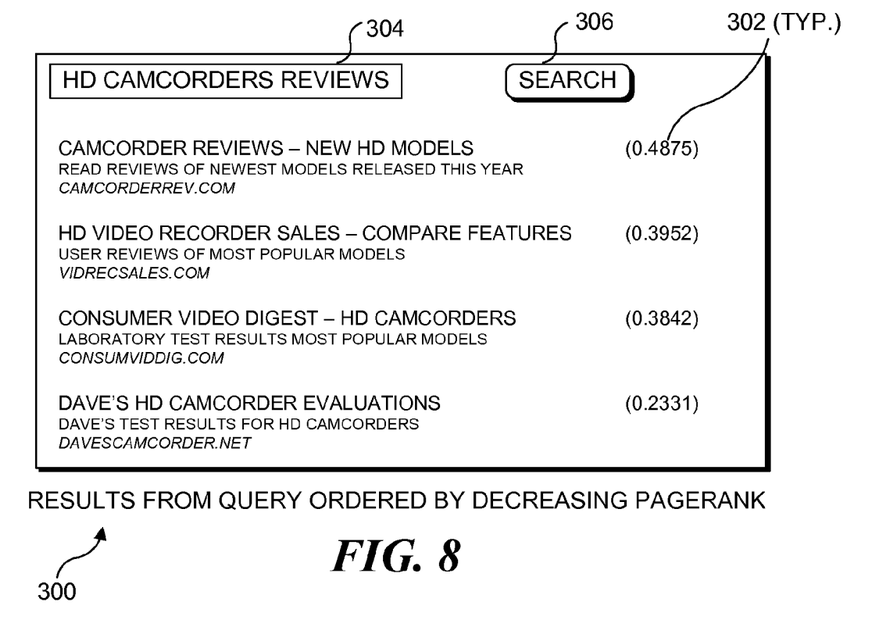
FIG. 8 is an exemplary partial listing of search results from a query, where the results are ordered in decreasing value of the PageRank of the results.
Figure 9:
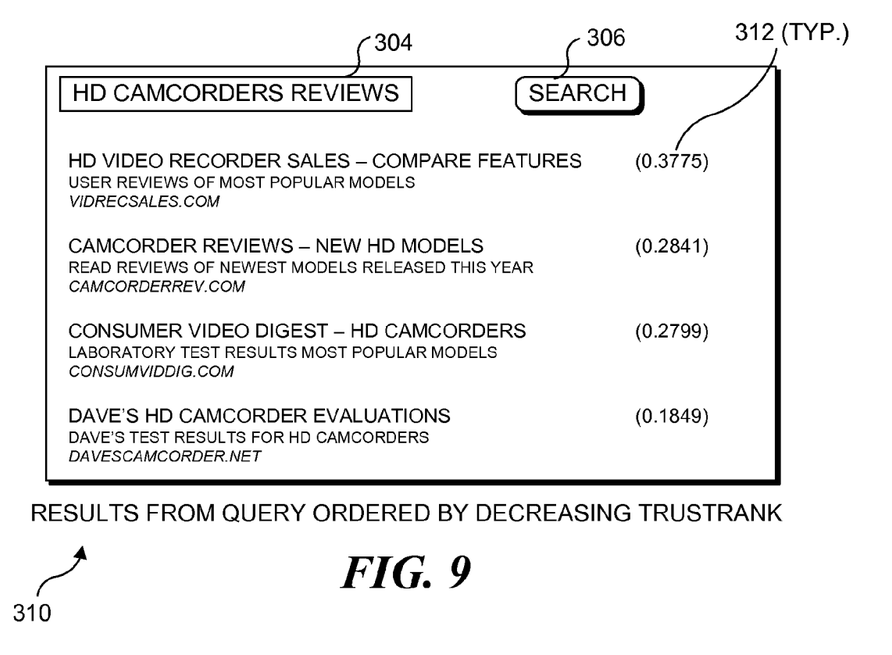
FIG. 9 is an exemplary partial listing of search results from a query, where the results are ordered in decreasing value of the TrustRank of the results.

FIGS. 8 and 9 illustrate two examples showing the results of a query to find web pages that relate to reviews of high definition (HD) camcorders. In FIG. 8, a partial listing 300 shows some of the web pages listed in order of decreasing PageRank 302, while in FIG. 9, a partial listing 310 illustrates exemplary web pages listed in order of decreasing TrustRank 312. In addition, each of these Figures includes a query box 304 and a search button 306, which can be selected to redo the search after the query entered in query box 304 has been modified. Although these two Figures respectively show the PageRank and the TrustRank of each web page included in the list, alternatively, the listing could omit the PageRank and TrustRank of the web pages. It also be apparent that other types of scores for web pages could be determined using the present method and then applied to determine the order in which web pages are displayed in regard to a query or for use in some other software program.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for determining a score for each of a plurality of web pages, wherein the score of a web page relates to a predefined characteristic of the web page, comprising the steps of
　(a) creating a directed graph that defines regions for at least a portion of a network, based on properties associated with the regions, wherein the web pages included in each region have the same score;
　(b) determining the scores of the web pages in the regions of the directed graph using the Helmholtz equation; and
　(c) physically carrying out at least one function selected from the group of functions consisting of:
　　(i) storing the scores of the web pages in a non-volatile storage;
　　(ii) displaying the scores of the web pages;
　　(iii) displaying a sequence of web pages in an order that is based upon the scores of the web pages included in the sequence;
　　(iv) displaying web pages in groups that are based upon the scores of the web pages in each group; and
　　(v) presenting to potential customers a rank ordering of web pages related to online services or products in response to a search by the potential customer.

2. The method of claim 1, wherein the step of determining the scores of the web pages comprises the step of accelerating the determination of the scores using the Helmholtz equation.

3. The method of claim 2, wherein the step of accelerating the determination of the scores using the Helmholtz equation comprises the steps of:
　(a) setting up a mesh for the regions;
　(b) setting up a compressed matrix for the mesh;
　(c) iteratively solving the compressed matrix to obtain a value at each node of the directed graph, where nodes of the directed graph correspond to web pages; and
　(d) normalizing the values that were obtained for the nodes to determine the scores of the web pages.

4. The method of claim 1, wherein the scores comprise one of PageRanks and TrustRanks for the web pages.

5. The method of claim 1, further comprising the step of determining scores that are specific to one item selected from the group consisting of a user, a domain, and a context, in regard to which the scores are being determined.

6. The method of claim 2, wherein the step of accelerating the determination of the scores using the Helmholtz equation comprises the step of employing a block decomposition of an associated Green's function method of moments approach for determining the scores of the web pages.

7. The method of claim 1, further comprising the step of selecting a mesh for the directed graph and a basis function when solving for the scores of the web pages, wherein the mesh and the basis function determine a level of coarseness for the directed graph, and thereby a resolution in determining the scores of the web pages.

8. The method of claim 1, further comprising the step of adding a time varying term to the Helmholtz equation before determining the scores of the web pages.

9. A nontransitory memory medium on which machine readable and executable instructions are stored for use in determining a score for each of a plurality of web pages, wherein the score of a web page relates to a predefined characteristic of the web page, by performing the following:
 (a) creating a directed graph that defines regions for at least a portion of a network, based on properties associated with the regions, wherein the web pages included in each region have the same score;
 (b) determining the scores of the web pages in the regions of the directed graph using a Helmholtz equation; and
 (c) physically carrying out at least one function selected from the group of functions consisting of:
  (i) storing the scores of the web pages in a non-volatile storage;
  (ii) displaying the scores of the web pages;
  (iii) displaying a sequence of web pages in an order that is based upon the scores of the web pages included in the sequence;
  (iv) displaying web pages in groups that are based upon the scores of the web pages in each group; and
  (v) presenting to potential customers a rank ordering of web pages related to online services or products in response to a search by the potential customer.

10. The memory medium of claim 9, wherein the machine readable and executable instructions further cause an accelerated determination of the scores using the Helmholtz equation.

11. The memory medium of claim 10, wherein the machine readable and executable instructions cause the accelerated determination of the scores using the Helmholtz equation comprised by:
 (a) setting up a mesh for the regions;
 (b) setting up a compressed matrix for the mesh;
 (c) iteratively solving the compressed matrix to obtain a value at each node of the directed graph, where nodes of the directed graph correspond to web pages; and
 (d) normalizing the values that were obtained for the nodes to determine the scores of the web pages.

12. The memory medium of claim 9, wherein the scores comprise one of PageRanks and TrustRanks for the web pages.

13. A system for determining a score for each of a plurality of web pages, wherein the score of a web page relates to a predefined characteristic of the web page, comprising:
 (a) a memory in which machine executable instructions are stored;
 (b) a display device for displaying text and images; and
 (c) a processor coupled to the memory and the display device, for executing the machine executable instructions, to carry out a plurality of functions, including:
  (i) creating a directed graph that defines regions for at least a portion of a network, based on properties associated with the regions, wherein the web pages included in each region have the same score;
  (ii) determining the scores of the web pages in the regions of the directed graph using a Helmholtz equation; and
  (iii) physically carrying out at least one function selected from the group of functions consisting of:
   (1) storing the scores of the web pages in the memory for subsequent use;
   (2) displaying the scores of the web pages;
   (3) displaying a sequence of web pages in an order that is based upon the scores of the web pages included in the sequence;
   (4) displaying web pages in groups that are based upon the scores of the web pages in each group; and
   (5) presenting to potential customers a rank ordering of web pages related to online services or products in response to a search by the potential customer.

14. The system of claim 13, wherein the machine executable instructions cause the processor to determine the scores by applying one or more acceleration techniques.

15. The system of claim 14, wherein the machine executable instructions accelerate the determination of the scores by implementing the following functions:
 (a) setting up a mesh for the regions;
 (b) setting up a compressed matrix for the mesh;
 (c) iteratively solving for a value at each node of the compressed matrix of the directed graph, where nodes of the directed graph correspond to web pages; and
 (d) normalizing the values that were obtained for the nodes to determine the scores of the web pages.

16. The system of claim 13, wherein the scores of the web pages comprise one of PageRanks and TrustRanks for the web pages.

17. The system of claim 13, wherein the machine executable instructions further cause the processor to determine scores that are specific to one selected from the group consisting of a user, a domain, and a context.

18. The system of claim 14, wherein the machine executable instructions cause the processor to accelerate the determination of the scores of the web pages by employing a block decomposition of an associated Green's function method of moments approach.

19. The system of claim 13, wherein the machine executable instructions cause the processor to select a mesh for the directed graph and a basis function when solving for the scores of the web pages, wherein the mesh and the basis function determine a level of coarseness for the directed graph, and thereby a resolution in determining the scores of the web pages.

20. The system of claim 13, wherein the machine executable instructions cause the processor to add a time varying term to the Helmholtz equation before determining the scores of the web pages.

* * * * *